April 2, 1968 P. D. NEITZ 3,375,707
TRANSDUCER DRIVER
Filed April 15, 1965 2 Sheets-Sheet 2

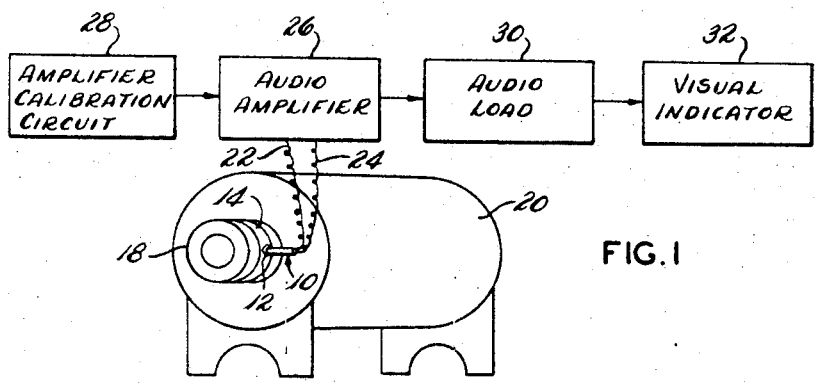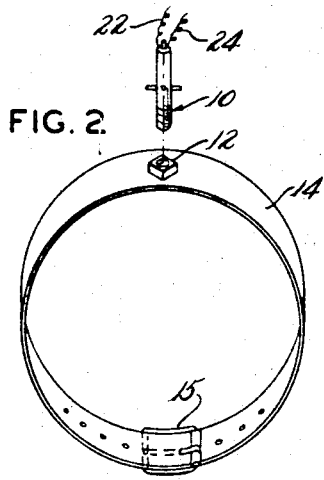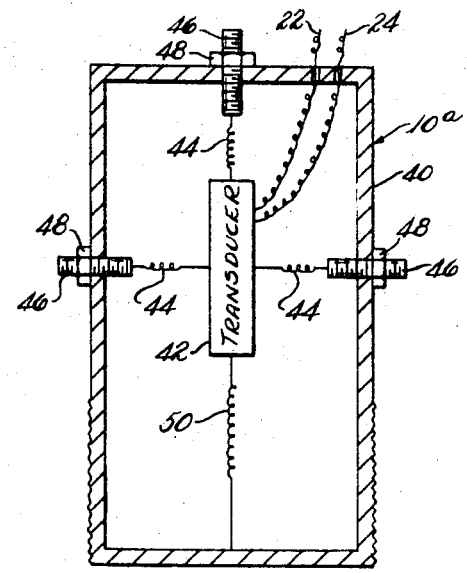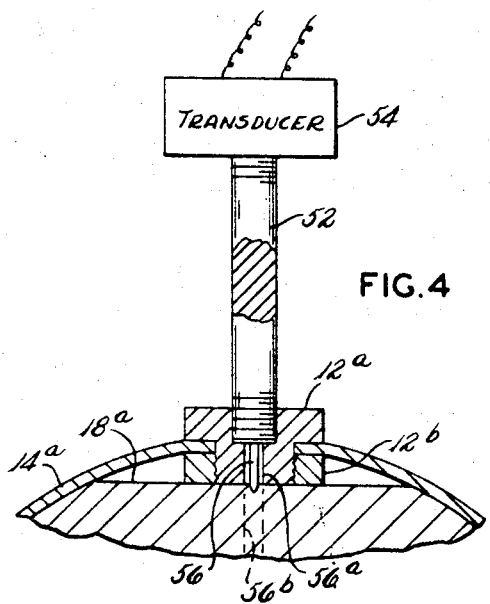

INVENTOR.
PAUL D. NEITZ
BY Oldham & Oldham
ATTYS.

United States Patent Office 3,375,707
Patented Apr. 2, 1968

3,375,707
TRANSDUCER DRIVER
Paul D. Neitz, 1400 Massillon Road,
Akron, Ohio 44306
Filed Apr. 15, 1965, Ser. No. 448,327
9 Claims. (Cl. 73—71.4)

ABSTRACT OF THE DISCLOSURE

Apparatus for measuring vibration, generally in rotating equipment, which has great sensitivity and is mounted directly to the equipment whereby successive vibration measurements are relative to each other to provide comparable data indicating wear and possible breakdown of the equipment. Specifically, the apparatus utilizes a directional sensitive driver to actuate a transducer, and includes means to control the sensitivity of the pickup and isolate the transducer from all outside sources of vibration other than the driver.

---

This invention relates to a transducer driver, and more particularly to a unique concept to permit uniform measurement of vibrations in rotating equipment generally, but including any apparatus where vibrations are present by utilizing a highly accurate and sensitive driver associated with a transducer.

Heretofore, it has been well known to utilize transducers for measuring vibrations in pieces of equipment. More particularly, Patents Nos. 2,754,678, and 3,095,532 show block diagram circuits for detecting vibrations utilizing a transducer as the vibration pick up. However, generally all these patents have no specific mounting or driving means for the transducer itself. Masking or suitable adhesive tape may be utilized to position the transducer, which results in inherent errors because of the different mounting for each particular occasion, particularly where these measurements are taken over a period of years. Where extreme accuracy is desired and relative changes between successive readings on the same piece of equipment, the particular drive means and uniformity in the drive to the transducer is essential for accuracy.

It is well known that rotating equipment is subject to deterioration, and more particularly that the bearings in rotating equipment fail after variable periods of time. Therefore, in view of the fact that it is desirable to have prime operating equipment in use during the normal working day, it is possible to learn when preventative maintenance is required by taking vibration readings from such equipment on regular intervals to determine when deterioration has taken place which will soon result in failure. It is extremely important in such successive vibration measurement readings that the equipment be measured at exactly the same point, and with exactly the same drive to the measuring transducer for each successive reading. Also, such detection must be of high sensitivity since the relative differences in readings will be quite small. With the present state of the art, such techniques are not possible.

Therefore, it is the general object of the present invention to avoid and overcome the foregoing, and other difficulties of and objections to, prior art practices by the provisions of a transducer driver which may be removably connected to a piece of equipment for measuring the vibrations thereof whereby a firm and positive contact is made with the equipment in a permanent, or removable manner with a transducer driver having great sensitivity and feeding into a transducer connected directly thereto at a spaced relation from the piece of equipment being measured.

A further object of the invention is to provide a transducer driver which may always be positioned in exactly the same relation relative to a particular piece of equipment to insure that measurements of the vibration of the equipment at successive intervals will truly represent a relative variation in the vibration recorded.

A further object of the invention is to provide a transducer driver associated with the transducer for measuring vibrations in equipment whereby the sensitivity of the driver feeding vibration information to the transducer may be appropriately varied to provide more precision measurement of particular vibrations in particular equipment.

A further object of the invention is to provide a transducer driver which is very inexpensive, yet highly effective in operation to produce uniform readings of vibration in equipment, which readings are highly accurate and comparable even though taken at different times.

The aforesaid objects of the invention, and other objects which will become apparent as the description proceeds, are achieved by providing in an apparatus to measure vibration the combination of an elongated strap adapted to be securely mounted in fixed relation on a piece of equipment having vibrations to be measured, a mounting means secured in fixed relation to the strap and firmly engaging the piece of equipment when the strap is removably positioned thereon, a transducer driver removably but fixedly engaging the mounting means, a transducer driven by the transducer driver, and means to measure the audio signals detected by the transducer.

For a better understanding of the invention reference should be had to the accompanying drawings wherein:

FIGURE 1 is a diagrammatic indication of how the transducer driver and transducer are associated with a piece of rotating equipment, also showing in block diagram form the readout equipment;

FIGURE 2 is an enlarged perspective view of the mounting strap, and the transducer driver of FIGURE 1 in the removed position;

FIGURE 3 is an enlarged cross sectional view of the tranducer driver of FIGURE 2 illustrating how the transducer is mounted internally thereof, and clearly showing how the sensitivity of audio vibration information received by the transducer may be appropriately varied;

FIGURE 4 illustrates in vertical section a modified transducer driver, and more particularly the mounting of the nut carried by the strap showing the engagement of the nut with the equipment;

Figure 5:
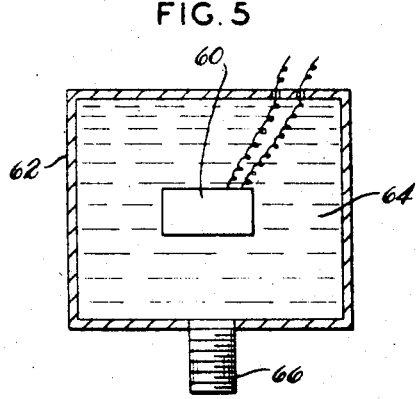
FIGURE 5 is a vertical cross sectional view of a transducer driver and associated transducer representing a modified form of the invention.

A transducer, as used in this invention, is a device designed to transform a physical stimulus into a change in an electrical circuit parameter, usually to provide remote readout, print out, or data input for subsequent computer processing either as information or for a control function.

Transducers may logically be grouped by the stimulus to which they are subjected and further subdivided with reference to the principle used to transfer that stimulus into useful information. In this particular instance, the invention is concerned with vibrations to be measured through the housing or other supporting frame for some type of moving, rotating, or reciprocating equipment. For this type of transducer measurement, the piezo-electric and vibrating-wire types are most frequently used. The piezo-electric utilizes a crystalline material which, under dynamic strain, produces an output voltage proportional to that strain. Because the output is only generated under dynamic conditions, this type of a device cannot be used for static or steady state measurements. The vibrating-wire transducer comprises a fine wire supported in such a way that its tension is varied by the applied stimulus. When this wire lies between the poles of a permanent magnet it vibrates at its natural frequency when an oscillating voltage of that frequency is applied to it. The output of this transducer, then, consists of an oscillating voltage which changes in frequency with the resonant frequency of the wire as it in turn varies in tension with the applied stimulus.

It should be understood, that reference to transducers hereinafter will include among others such well known devices as dynamic microphones, crystal types, ceramic types, contact microphones, carbon microphones, and magnetic sensitive pickups.

The usual manner of measuring vibration in machinery, rotating motors, and the like has been to utilize the piezo-electric transducer and to place it in position somewhere relative to the housing by adhesive tape or other suitable holding techniques. Because the positioning of such an element usually in the form of a square or a rectangular block is extremely difficult to effect twice at the same place and with the same area contacting the housing, such measuring technique is necessarily very inaccurate, as well as being essentially omni-directional making precision reading of bearing vibrations almost impossible.

Basically, the concept of the invention as shown in FIGURE 1, utilizes a transducer driver, indicated generally by numeral 10, mounted on a receiving member, such as a nut 12 carried by a supporting member, such as a band 14. The band 14 is received or secured in fixed position around, for example, an end bearing support housing 18 of a motor 20. The electrical output from the transducer driver 10 feeds through suitable wires 22 and 24 into an audio amplifier 26. The audio amplifier 26 is appropriately calibrated by a conventional circuit 28 and feeds through an audio load 30 into some type of well known visual or audio indication system 32. The invention contemplates that any suitable electrical metering scale with needle indication would appropriately meet the objects of the invention.

FIGURE 2 more clearly shows the band 14 mounting the nut 12 to receive the transducer driver 10. The invention contemplates that the band 14 might be made from suitable elastic whereby an appropriate belt buckle 15 could be used to secure the ends together. An elastic band 14 would perhaps be most adaptable for a temporary usage so that one band and nut may be used as a tool to measure many pieces of equipment. However, it should be understood that the invention also contemplates that the band 14 might be a metal strap and permanently affixed to the particular piece of equipment where measurements are to be taken. If the band is elastic, the nut 12 may extend completely through the band 14 and have its bottom surface in full firmly held engagement with the housing of the particular piece of equipment. However, on a metal strap a firm engagement of the nut on the top of the strap will meet the objects of the invention. While only a threaded nut and bolt type mounting is illustrated, it should be understood that a snap-on mounting such as a BNC or ball socket may be utilized if they provide a firm and positive locking action.

FIGURE 4 more clearly shows an elastic band 14a with a nut 12a positioned therethrough and held in fixed relationship relative to the band by a base locking nut 12b. Note the full and flush contact of the bottom end of nut 12a with the surface of a housing 18a. As a particular feature of the invention, the bottom surface of the mounting nut will have a shape to preferably exactly conform with the surface of the housing to which it is firmly applied. If the nut is mounted to the top surface of a metal strap, the strap will preferably conform to the surface of the piece of equipment to be measured.

FIGURE 3 is an enlarged cross sectional view of a transducer driver 10a which might be used in FIGURES 1 and 2. The transducer driver 10a comprises a closed housing 40 with a typical transducer 42 mounted centrally thereof. The transducer 42 is resiliently held in position by a plurality of helical springs 44 in tension with each spring associated with a respective adjustable screw 46. The screws 46 are held in locked position relative to the housing 40 by a respective nut 48. The actual drive to the transducer 42 is achieved by a separate helical driving spring 50 connected to the bottom end thereof and to the bottom end of the housing 40. The spring 50 will also normally be in tension and of appropriate coil diameter and wire thickness to effect the desired drive. Also, as an adjustable feature the tension on spring 50 may be varied by controlling the tension on the springs 44. Therefore, it should be readily understood that a variation in the tension on spring 50 will effect the sensitivity of vibration readout on the transducer 42. The control of the sensitivity allows this particular transducer driver 10a to very accurately determine vibration readings across a wide range covering very small vibrations to very large vibrations, without having to unduly complicate the associated electrical circuitry shown in FIGURE 1. It should be understood that the transducer driver 10a actually bottoms in the nut 12 in a firm and very fixed relationship to insure, positively, that all vibrations will be uniformly transmitted to the transducer 42.

A high degree of sensitivity and directional transmission of the vibrations is necessary so that accuracy may be determined in measuring $\mu\mu$ volts without distortion by outside noise. The most sensitive receiving and amplification equipment are useless without a measurable signal input.

FIGURE 4 contemplates use of a solid transducer driver 52 removably screwed into its respective mounting nut 12a and driving its respective transducer 54. As a means to further enhance the actual driving capacity of the driver 52, a separate pointed drive 56 generally made from a very hard metal and directly carried by the end of driver 52 makes a pointed contact with the housing 18a. The drive 56 may have an air gap spacing as at 56a relative to the nut 12a to further increase the directional pickup features. Also, if desired the drive 56 may extend through a properly positioned hole, indicated by dotted lines 56b, through the housing 18a so as to engage directly onto the race of the particular bearing being measured. In certain circumstances the drive 56 may be mounted directly to the nut 12a.

Figure 6:
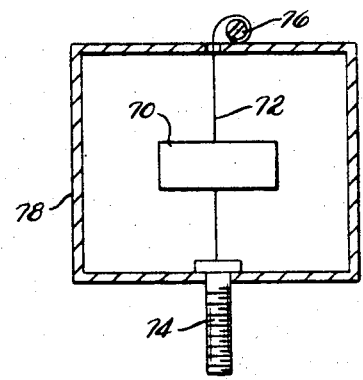
FIGURE 6 is a vertical cross sectional view of a transducer driver and transducer representing another modified form of the invention.
Figure 7:
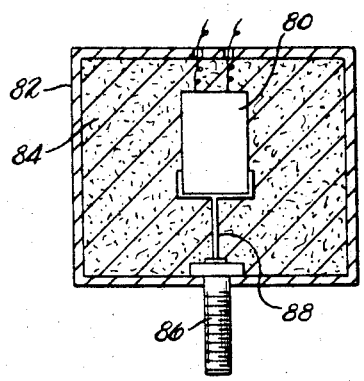
FIGURE 7 is a vertical cross sectional view of a transducer driver and transducer representing another modification of the invention.

FIGURES 5 through 7 represent modified embodiments of the transducer driver. More specifically, in FIGURE 5, a transducer 60 is mounted inside a housing 62 which is filled with a liquid, or a solution 64. The solution 64 has sufficient viscosity to hold the transducer 60 in its centrally mounted position. If a highly viscose or jelly-like material is utilized the transducer might sit or float on top of it or suitable insulated mounting means may position the transducer relative to the housing 62. A hollow threaded screw portion 66 is received in an appropriate mounting nut, as described above, so that all vibrations transmitted through the liquid carried by the screw 66 must pass through the solution 64 to actuate or drive the transducer 60. Therefore, in this embodiment, the solution 64 acts as the transducer driver. Naturally, the particular viscosity and vibration transmission characteristics of the solution or fluid 64 will control the actual drive to the transducer 60. The invention contemplates that the particular solution 64 might be appropriately varied to thereby control the sensitivity of the drive to the transducer. In fact an appropriate gas could be used.

FIGURE 6 illustrates a transducer 70 mounted on a single wire 72 connected at one end to a mounting screw 74 and at the other end to a tension adjustment 76. The transducer 70 is mounted substantially centrally located within a housing 78. In this instance, adjustment of the tension on the wire 72 will appropriately control sensitivity of the drive to the transducer 70 through the screw 74.

FIGURE 7 illustrates a transducer 80 mounted within a housing 82 and completely surrounded by a sound insulating material 84. A direct drive to the transducer 80 is achieved from a mounting screw 86 through a bifurcated driving arm 88. This particular embodiment completely eliminates the possibility of distortion of the readings obtained because of outside noises, generally audio, which might occur away from the equipment being measured during the vibration measurement. In other words, the sensitivity of this particular device will be extremely accurate because outside noise or vibration disturbances will not affect a reading.

It should be understood that any of the various modifications indicated in FIGURES 3 through 7 might be incorporated alone, or in combination with one or the other. This substantially enhances the flexibility of the driver, its sensitivity, its unidirectional pickup characteristics, and the precision of the vibration information measured. The fact that each of the specific drivers is designed to be associated with the mounting strap or nut insures that the reading will always be taken in the same place and with the same unidirectional drive characteristics on each individual piece of equipment.

While the invention illustrates only the strap of FIGURE 2, it should be understood that any mounting means which will provide the same reading time after time will meet the objects of the invention. For example, the nut might be welded into position or a threaded hole in the equipment might receive the transducer driver.

The use of a transducer driver as described above to take readings in the same location and with uniformity from a piece of equipment will indicate wear, deterioration, and possible breakdown of the bearings, or other supporting surfaces in the equipment, thereby allowing a much superior preventative maintenance program which will essentially eliminate machine breakdown during the time of high production. In other words, bearing or other part replacement may be achieved at a more opportune time whereby the breakdown will not affect production, assembly line techniques, or other valuable lost time. It is to be understood that this invention can also be used to monitor a decaying function, such as liquid cooling process, since as the liquid may contain small matters of unwanted materials the cooling process may become clogged.

While in accordance with the patent statutes only the best known embodiments of the invention have been illustrated and described in detail, it is to be particularly understood that the invention is not limited thereto or thereby, but that the inventive scope is defined in he appended claims.

What is claimed is:

1. In an apparatus to measure vibration noises in equipment, the combination of:
    a mounting means secured in fixed relation to an equipment having internal vibrations,
    a transducer driver removably secured to the mounting means whereby it is retained in firm contact with the equipment to detect such vibrations and provide unidirectional transmission thereof,
    a transducer affixed in spaced relation from the mounting means to the transducer driver and actuated thereby,
    means connected to the transducer driver to adjustably control the sensitivity of the vibration pickup thereby, and
    means receiving and measuring the vibration signals detected by the transducer.

2. An apparatus according to claim 1 where the transducer driver is a hollow housing threadably received in the mounting means, and which includes a plurality of adjustable springs resiliently mounting the transducer internally of the housing whereby the adjustment of the tension on the springs controls the sensitivity of the vibration pickup by the transducer.

3. In an apparatus to measure vibration the combination of:
    an elongated elastic strap adapted to be securely mounted in fixed relation on a piece of equipment having vibrations to be measured,
    a mounting means secured in fixed relation to the strap and firmly engaging the piece of equipment when the strap is removably positioned thereon,
    a transducer driver removably received in fixed relation by the mounting means, said transducer driver providing a unidirectional sensitive pickup of the vibrations from the equipment,
    a transducer driven by the transducer driver, and
    means to measure the audio signals detected by the transducer.

4. An apparatus according to claim 3 where the transducer driver is a solid stud with one end removably screwed into the mounting means, and where the mounting means has a very hard pointed driving member mounted in fixed relation thereto firmly forced into the equipment to be measured at one end and engaging the base of said one end of the transducer driver at the other end, and where the transducer is operatively connected to the opposite end of the transducer driver.

5. An apparatus according to claim 3 where the transducer driver is an elongate rod having at one end a very hard point which is firmly forced into the equipment to be measured and is directly connected at the other end to the transducer, and where the transducer driver is free from engagement with any outside member along its full length.

6. An apparatus according to claim 3 where the transducer driver houses a fluid and the transducer is suspended by the fluid whereby the transmission of the vibrations to the transducer is through the fluid.

7. In an apparatus to measure vibration noises the combination of
    a mounting means adapted to be secured in fixed relation to an equipment having internal vibrations,
    a transducer driver removably secured to the mounting means and engaging a specific point on the piece of equipment for transmitting unidirectional vibration information from that point,
    a transducer operatively driven by the transducer driver,
    means connected to the transducer driver to adjustably control the sensitivity of the vibration pickup by the transducer driver, and
    means to measure the vibration signals detected by the transducer.

8. An apparatus according to claim 7 where the transducer driver is fully insulated against pickup of any external audio noise and other vibration disturbances.

9. An apparatus according to claim 7 where the transducer driver is in tension, and means are provided to adjust the tension thereof whereby the sensitivity may be controllably adjusted.

References Cited

UNITED STATES PATENTS

| | | | |
|---|---|---|---|
| 1,725,872 | 8/1929 | Lawrence | 73—71.4 X |
| 3,145,311 | 8/1964 | Dickey | 73—71.2 X |
| 3,254,528 | 6/1966 | Michael | 73—71.4 |

FOREIGN PATENTS 175,311   2/1922   Great Britain.

RICHARD C. QUEISSER, *Primary Examiner.*

J. P. BEAUCHAMP, *Examiner.*